United States Patent
Lewis (10) Patent No.: US 11,815,944 B2
(45) Date of Patent: Nov. 14, 2023

(54) SYSTEM AND METHOD FOR SECURING FIRMWARE FUNCTION CALLS USING SESSION-BASED ENCRYPTION

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 17/176,273

(22) Filed: Feb. 16, 2021

(65) Prior Publication Data

US 2021/0256132 A1    Aug. 19, 2021

Related U.S. Application Data

(60) Provisional application No. 62/976,199, filed on Feb. 13, 2020.

(51) Int. Cl.
| | |
|---|---|
| *G06F 21/57* | (2013.01) |
| *G06F 21/54* | (2013.01) |
| *G06F 21/60* | (2013.01) |
| *G06F 21/45* | (2013.01) |
| *G06F 21/55* | (2013.01) |

(52) U.S. Cl.
CPC .......... *G06F 21/572* (2013.01); *G06F 21/45* (2013.01); *G06F 21/54* (2013.01); *G06F 21/554* (2013.01); *G06F 21/602* (2013.01); *G06F 2221/0751* (2013.01)

(58) Field of Classification Search
CPC ........ G06F 21/572; G06F 21/45; G06F 21/54; G06F 21/554; G06F 21/602; G06F 2221/0751
See application file for complete search history.

(56) References Cited

U.S. PATENT DOCUMENTS

| | | |
|---|---|---|
| 9,660,807 B2 | 5/2017 | Lewis |
| 9,699,655 B1 * | 7/2017 | Silis ................. H04L 9/3247 |
| 9,734,311 B1 | 8/2017 | Righi et al. |
| 10,871,955 B2 | 12/2020 | Lewis |
| 2019/0080092 A1 | 3/2019 | Lewis |

\* cited by examiner

*Primary Examiner* — Ayoub Alata
(74) *Attorney, Agent, or Firm* — McCarter & English, LLP; John S. Curran, Esq.

(57) ABSTRACT

Systems and methods for securing firmware function calls are discussed. More particularly, mechanisms for reducing the chance of tampering and information disclosure attacks against firmware function calls implemented in SMM/MM are described. Data may be passed to and from a calling entity to platform firmware via a communication channel where both the data and the means of decrypting the data are protected from potential snooping OS applications, drivers or DMA-enabled hardware devices.

12 Claims, 4 Drawing Sheets

SYSTEM AND METHOD FOR SECURING FIRMWARE FUNCTION CALLS USING SESSION-BASED ENCRYPTION

RELATED APPLICATION

This application claims priority to U.S. Provisional Patent Application No. 62/976,199, filed Feb. 13, 2020, the content of which is incorporated herein by reference in its entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

Some computing devices contain one or more processing elements such as Central Processing Units (CPUs) which, when in operation, can read from and also erase and/or write flash ROM. The CPU may have a normal operating mode and a second operating mode called System Management Mode (SMM) (also known as Management Mode in later UEFI specifications). When the CPU is in normal operating mode it can access all elements of the computer except certain memory regions exclusively dedicated to SMM mode. In contrast, when the CPU is operating in SMM mode it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) (also known as Management Mode Interrupts in later UEFI specifications) events including SMI events triggered by software or firmware. The exact triggers available differ somewhat from among system designs but the result when the platform appropriate trigger is used is that execution in main memory is immediately suspended and execution begins at a specific location in SMM memory.

BRIEF SUMMARY

Embodiments of the present invention secure firmware function call parameters and data passed between calling entities and platform firmware during the handling of requested firmware service calls. More particularly in one embodiment session-based security is provided using symmetric keys derived from a user-provided password provided to the calling entity that is also known to the firmware to encrypt and decrypt communications between the calling entity and the platform firmware. In another embodiment, a public half of an asymmetric key pair is provided by the platform firmware to a calling entity and used to encrypt a randomly generated symmetric key that is passed back to the platform firmware. After the platform firmware decrypts the encrypted randomly generated symmetric key provided by the calling entity using the private half of the asymmetric key pair, the randomly generated symmetric key is then used by the calling entity and the platform firmware to secure their communications.

In one embodiment, a computing platform-implemented method for securing firmware function calls using session-based security is provided. The computing platform is equipped with platform firmware and at least one processor. The method includes receiving with the platform firmware a request to establish a session between a calling entity and the platform firmware. The method also includes receiving with the platform firmware an encrypted password for the session from the calling entity. The password is supplied by a user to the calling entity and encrypted with a symmetric key generated from the password, a copy of the password having been previously stored with the firmware. The method further includes decrypting the received encrypted password with the platform firmware using a symmetric key generated from the copy of the password previously stored with the firmware to verify the password. Additionally, the method includes performing one or more requested firmware services during the session. The calling entity and platform firmware exchange firmware function call parameters and data and respectively encrypt and decrypt the firmware function call parameters and data using the symmetric key.

In another embodiment, a computing platform-implemented method for securing firmware function calls is provided. The computing platform is equipped with platform firmware and at least one processor. The method includes receiving with the platform firmware an initial request for firmware services from a calling entity and providing from the platform firmware the calling entity with a public half of an asymmetric key pair, the private half of the asymmetric key pair also being known to the platform firmware. The method further includes receiving with the platform firmware a copy of a randomly generated symmetric key from the calling entity. The randomly generated symmetric key is encrypted using the public half of the asymmetric key pair. The method additionally includes the platform firmware decrypting the copy of the randomly generated symmetric key using the private half of the asymmetric key pair. The method also performs the requested firmware services. The calling entity and platform firmware exchange firmware function call parameters and data and respectively encrypt and decrypt the firmware function call parameters and data using the randomly generated symmetric key or the copy of the randomly generated symmetric key.

In an embodiment, a computing platform is configured to provide session-based security and includes one or more processors and non-volatile storage holding platform firmware. The platform firmware when executed receives a request to establish a session between a calling entity and the platform firmware. The platform firmware further receives an encrypted password for the session from the calling entity. The password is supplied by a user to the calling entity and encrypted with a symmetric key generated from the password, a copy of the password having been previously stored with the platform firmware. The platform firmware also decrypts the received encrypted password using a symmetric key generated from the copy of the password previously stored with the firmware to verify the password. Additionally the platform firmware performs one or more requested firmware services during the session. The calling entity and platform firmware exchange firmware function call parameters and data and respectively encrypt and decrypt the firmware function call parameters and data using the symmetric key.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention provide mechanisms for reducing the chance of tampering and information disclosure attacks against firmware function calls implemented in SMM/MM. More particularly, embodiments enable passing data to and from a calling entity to the firmware via a communication channel where both the data and the means of decrypting the data are protected from potential snooping OS applications, drivers or DMA-enabled hardware devices.

As used herein, the following terms have the following meaning unless a different meaning is clearly apparent from the context in which the term is used:

System Management Interrupt (SMI) is the highest priority interrupt in x86 systems. Detected on instruction boundaries, it places a CPU core into SMM/MM, saves some CPU registers at a pre-defined memory location and begins execution at a pre-defined entry point in SMRAM. It is also referred to as Management Mode Interrupt (MMI) in later UEFI specifications.

SMM refers to System Management Mode. It is a CPU execution mode entered upon detection of an SMI. SMM is also referred to as Management Mode (MM) in later UEFI specifications.

Software SMI refers to an SMI initiated by software, usually by writing a value to a specified I/O port.

Conventionally, OS applications, OS drivers and runtime firmware-provided services often make calls to services provided by the platform firmware (such as UEFI BIOS) using software-generated System Management Interrupts (SMIs) which trigger a switch to SMM/MM to handle the calls. The OS applications, OS drivers and runtime firmware-provided services making these calls are also variously referred to herein as a "caller" and "calling entity". Parameters may be passed to the firmware using a fixed memory buffer where virtual addresses may be mapped 1:1 with physical addresses. Returned data is passed back from the firmware handling the request using a similar (or the same) fixed memory buffer. These memory buffers are called "communication buffers." In order to invoke these firmware services, the caller copies parameters into the communication buffer and optionally into CPU registers and a specific I/O memory mapped I/O address is written or a specific CPU instruction is executed to initiate the SMI. After performance of the requested service, the invoked firmware service copies data into the communication buffer and returns, whereupon the caller (e.g. OS application, OS driver or runtime firmware-provided service) can retrieve the data.

Unfortunately, a problem exists in that the caller of the firmware service and the firmware are trusted, but the communication channel (the communication buffer) is not trusted. In this case, another application or driver or Direct Memory Access (DMA)-capable hardware device might alter or read the contents of the communication buffer after the caller has copied the parameters to the communication buffer but before the software SMI is invoked. Alternately, another application or driver or DMA-capable hardware device might alter or read the contents of the communication buffer after the results of handling the firmware service request have been returned but before the caller has read the returned data.

These scenarios lead to possible information disclosure and tampering security vulnerabilities related to the information being exposed in the communication buffer. To address these issues, embodiments of the present invention create a secure communication channel between a caller and the firmware where all data being passed between the caller and firmware is encrypted so that even if malicious entities intercept the bytes exchanged in the communication buffer, including the bytes indicating the key and encryption strategy, the intercepting entity will still not be able to read any of the actual data that was sent. Further, embodiments also provide a solution to another common problem: how does the application prove to the firmware that it should be trusted? In many cases, the application itself is not trustworthy, but rather requests trust based on user credentials, such as a password that has previously been enrolled with the firmware. However, if the credential information (e.g. a password) must be passed to the firmware in the communication buffer, then that password could be snooped by another OS driver, application or DMA-capable hardware device, thus allowing another OS driver or application to spoof the firmware, thus leading to elevation of privilege vulnerabilities. However, by encrypting the contents of the communication buffer as described herein, a secure channel is created so that passwords may be passed to the firmware without risk of snooping.

In a further embodiment, the encryption of the communication buffer enables a series of firmware service calls to be secured. When only a single call or a few calls are required, it is usually not a problem for the caller to go through the authentication process (whereby the caller provides the necessary proof of having privileges) each time. But when an action requires many calls to be made, it can be cumbersome to repeat the authentication process each time. In these cases, it is useful to open a session with the platform firmware (usually with a service call) in which authentication is obtained for a type of service. Then zero or more operations are carried out using the privileges granted by that authentication. Since the channel between the caller and the firmware is encrypted with a key that the attacker does not have and the caller has been authenticated using the user's password, then subsequent calls in the same session can be assumed to have the same privileges as the user. Afterwards, the session is closed, because it is implicit in the sequence of operations, or because a close-session service call is made, or because a time limit has expired or because of a platform reset, or because of another unexpected caller termination.

Embodiments allow passing data to and from the calling application to the firmware via a communication channel where both the data and the means of decrypting the data are protected from potential snooping OS applications, drivers or DMA-enabled hardware devices. Embodiments do not require authentication with each call in order to maintain security and the authentication can be combined with the creation of the session. In some embodiments, silicon technology can be used to protect the communication buffer from DMA-enabled hardware devices. In one embodiment, silicon technology may be used to protect the application software that handles the encryption key from snooping.

Embodiments protect the original authentication information by presenting it only in encrypted form and protect data returned from the firmware by also encrypting the returned data. As a result it is very difficult for a rogue agent to make an unauthorized service call, since all parameters must be encrypted using a key that the rogue agent does not have. If a rogue agent does somehow manage to get the current session token, then the authorized agent's next call will fail, which can trigger a security log event and lead to the session being closed.

In one embodiment, the session data is encrypted using a key derived from a password previously enrolled with the firmware. In an embodiment, the password may be the "user" password or "system" password. The password may be converted into a key using a standard algorithm, such as, but not limited to, PBKDF2. In one embodiment, a SMM software interface may be provided that allows OS applications to communicate with UEFI firmware.

Typically, to call firmware services, an application (or the driver acting as the application's proxy or another calling entity), places the function number into the AH CPU register and writes the value 0xEF to I/O port 0xb2. This writing of the value triggers an SMI in the CPU, which transitions into SMM. The firmware detects the management interrupt source, sees that it is a software SMI and calls into a command dispatcher. The command dispatcher uses the value in the AH register and jumps to the command handler associated with that value. The command handler reads the parameters from either CPU registers or the command buffer, depending on the command, performs the action, and places the results in the command buffer and the status code in the AL CPU register.

Figure 1:
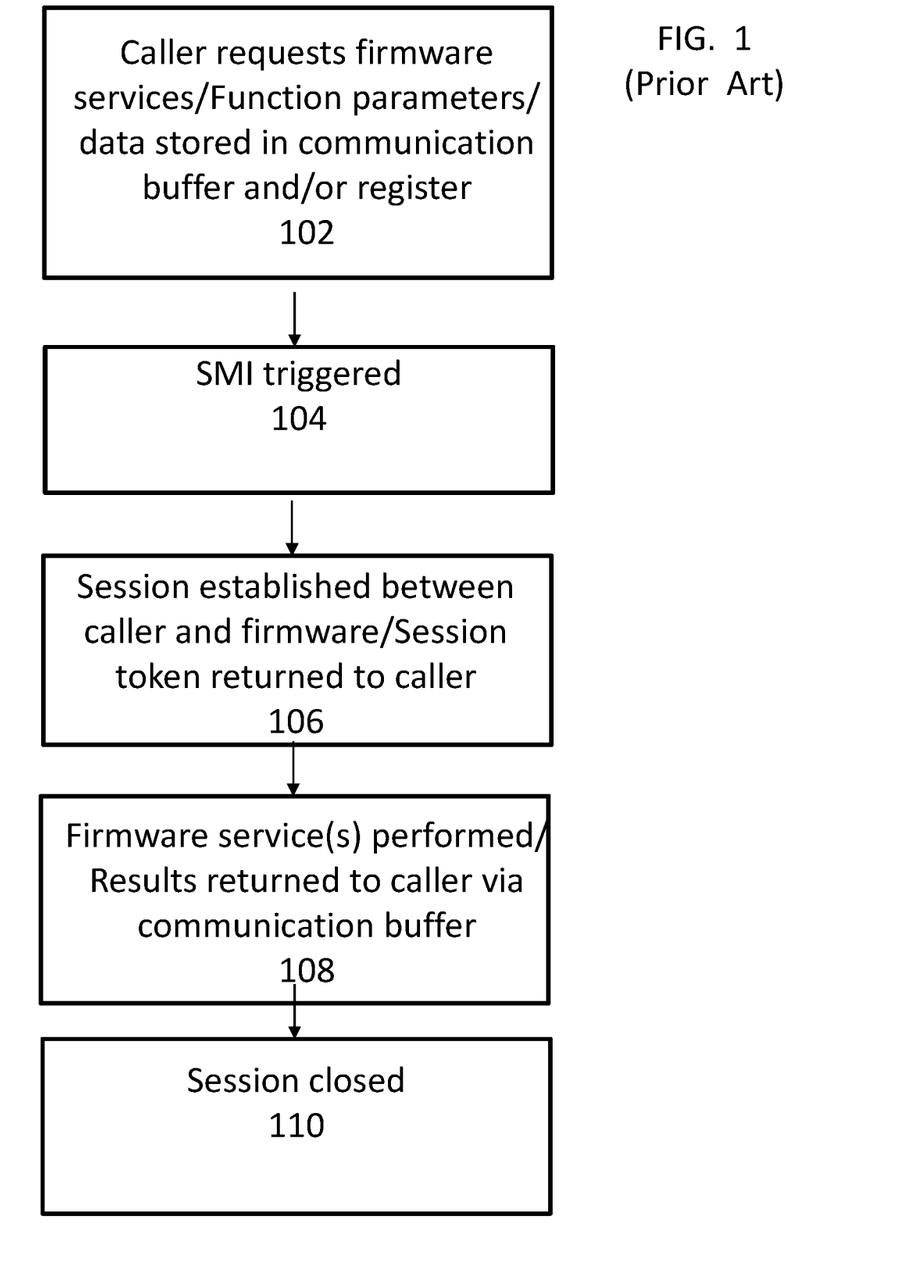
FIG. 1 (prior art) depicts an exemplary sequence of steps to open a session between platform firmware and a caller.

To provide protection when calling the firmware service, the caller may first attempt to establish a session with the platform firmware via an interface available in SMM. FIG. 1 (prior art) depicts an exemplary sequence of steps to open a session between platform firmware and a caller. The sequence begins when an OS application (or other calling entity) is preparing to perform some action that requires support from the firmware services. An example might be to change a password. Function parameters are stored in the communication buffer or CPU registers (step 102) and an SMI is triggered, usually by writing a particular value to an I/O port (step 104) which transitions the CPU into SMM. A session is established between the caller and the platform firmware with the session token being returned to the caller for use in subsequent communications (step 106). A security level may optionally be set (such as requiring a password to perform certain services) if the following commands require a specific security level and the SMM software interface may be locked to prevent more than one session being open at a time. The requested firmware services are performed (step 108) and the results returned to the caller via a communication buffer (step 110).

Figure 2:
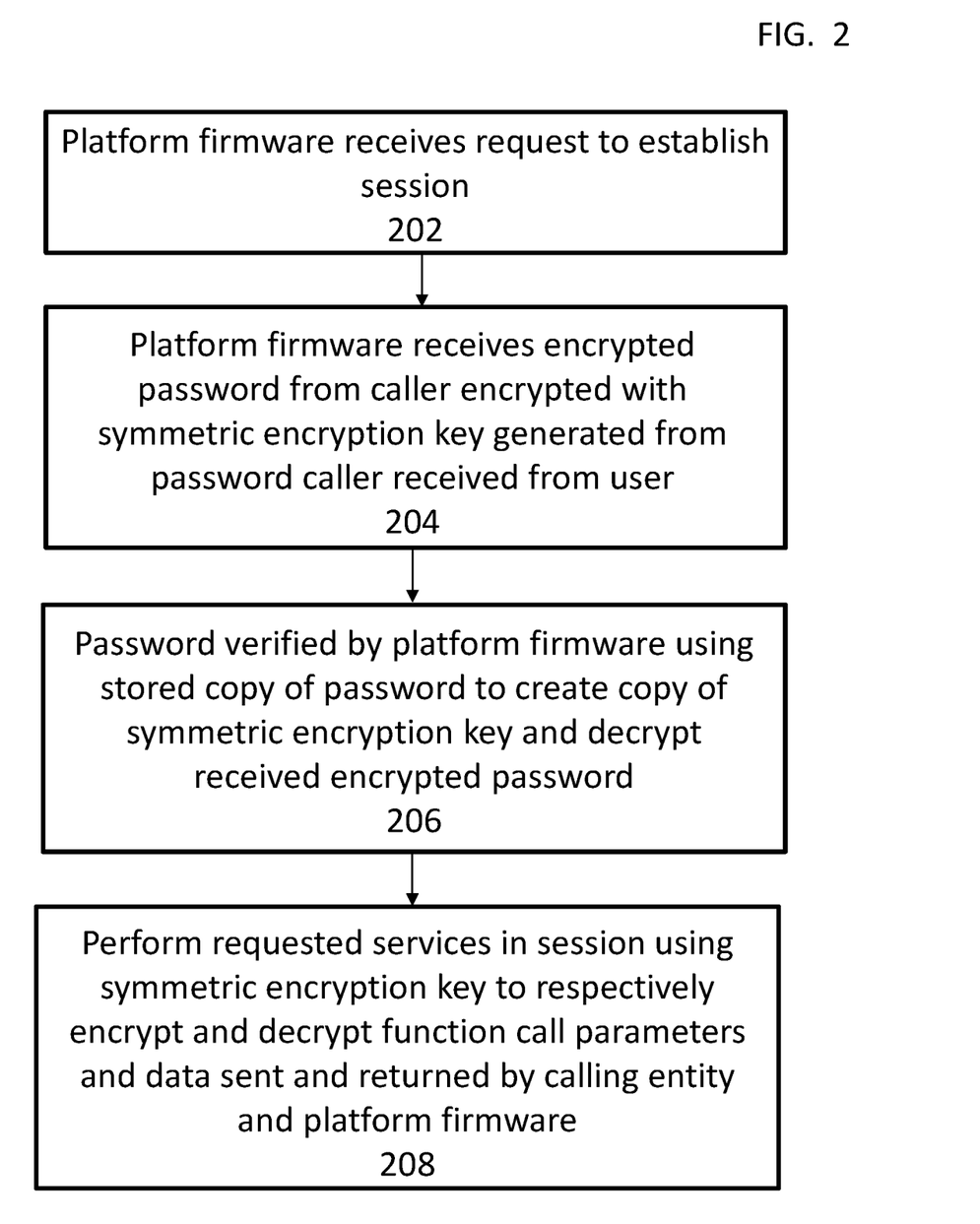
FIG. 2 depicts an exemplary sequence of steps for securing session data related to firmware services using an encryption key generated from a user-supplied password in an exemplary embodiment.

Embodiments alter the conventional sequence of FIG. 1 to provide greater security for the parameters and data being passed via the communication buffer. FIG. 2 depicts an exemplary sequence of steps for securing session data related to firmware services using an encryption key generated from a user-supplied password in an exemplary embodiment. The platform firmware receives a request from a calling entity, such as an OS application, for a session to perform firmware services and the request may specify the requirement of a password for the session (step 202). The platform firmware returns a session token to the caller and then receives an encrypted password from the caller for the session that is encrypted with a symmetric encryption key generated from a user-supplied password supplied to the caller (step 204). The caller may receive the password from the user in a number of ways. For example, a command-line application may allow the user to supply the password on the command-line. A dialog may display and ask the user for the password. The password may also be entered on a separate physical pin pad by the user. It will be appreciated that other mechanisms for soliciting the password from the user are also within the scope of the present invention. Preferably, the passwords being supplied should meet well-known password security metrics to prevent dictionary, rainbow or brute force attacks. Of note, the password being requested from the user is a password that is already known to, and previously supplied/enrolled with, the firmware. Once the calling entity receives the password from the user, the caller generates an encryption key from the password using a key derivation function (known to the firmware) such as PBKDF2, bcrypt, scrypt, Argon2, Catena, Lyra2, etc. In one embodiment, the password supplied by the user is salted with the session token returned from the previous call, encrypted using the encryption key and placed in the command buffer. The salting may be used to prevent replay attacks where the contents of the buffer are saved and then used again with this command. The password can be verified by the firmware generating its own copy of the symmetric encryption key from the stored copy of the password (optionally salted with the session token) using the same key generation function and attempting to decrypt the received password using the resulting copy of the symmetric encryption key (step 206). In this manner, the password for the session (and the symmetric encryption key) is never provided to the firmware in unencrypted form. As a result, even if the communication buffer is insecure, malicious actors monitoring the communication buffer will have difficulty determining the password and encryption key required for the session. In one embodiment, the session token is updated and included in encrypted form on each return of data to the caller by the platform firmware. Following a successful decryption/verification, the calling entity and the platform firmware then respectively encrypt and decrypt the function call parameters and data related to the requested firmware services that is being sent and received in the session via the communication buffers using the symmetric encryption key generated from the password (step 208). For example, when handling the firmware service request, the platform firmware decrypts the parameter data using its own key generated from the previously stored/enrolled password, performs the requested service, and returns the results in encrypted form using the symmetric encryption key to encrypt the result data before storing it in a communication buffer for later retrieval by the caller. The caller may then retrieve the encrypted result data from the communication buffer and decrypt the retrieved data using its copy of the symmetric encryption key.

In an alternate embodiment, the authentication phase may be separate from the securing of the communication buffer. This allows buffer traffic to be encrypted even if the user's password is not known, or a password has not been enrolled, or the SMM software interface does not require password-authentication but encryption is still desired. In one embodiment, an initial firmware SM/MMI function call may be handled by the firmware providing the public half of an asymmetric key pair to the caller. A randomly generated symmetric key may then be encrypted using that public key and returned to the firmware using a second software SM/MMI function call so that the firmware decrypts the randomly generated symmetric key using the private half of the asymmetric key pair. Subsequent software SM/MMI function calls can send encrypted data to the firmware SM/MMI handler using that randomly generated symmetric key. In one embodiment, a session between the platform firmware and the caller may be established following the initial SM/MMI function call.

Figure 3:
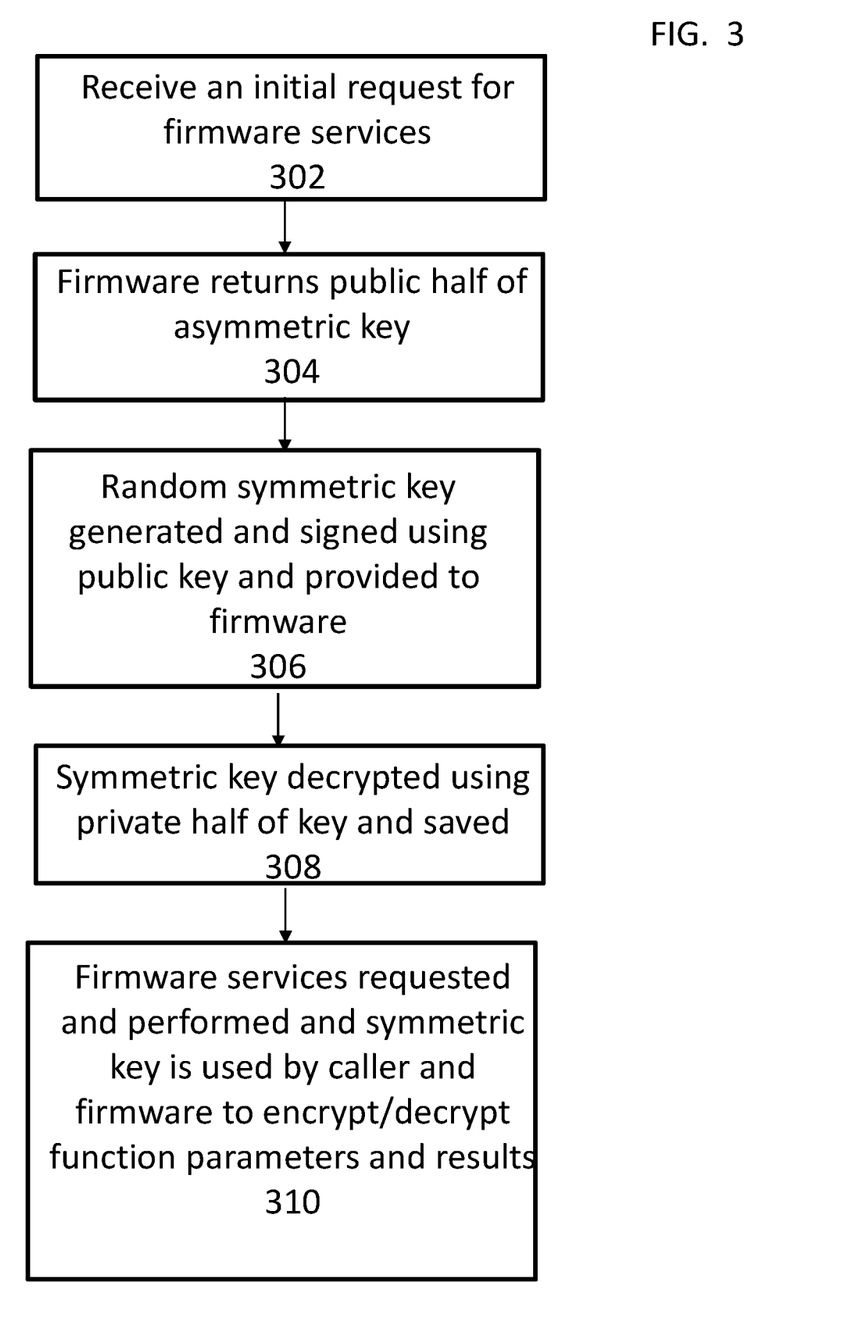
FIG. 3 depicts an exemplary sequence of steps for securing data related to firmware services using a randomly generated symmetric key protected via a public-private key pair in an exemplary embodiment.

FIG. 3 depicts an exemplary sequence of steps for securing data related to firmware services using a randomly generated symmetric key protected via a public-private key pair in an exemplary embodiment. The sequence begins as an OS application or other calling entity is preparing to perform some action that requires support from the firmware services, such as, but not limited to, changing a password. More particularly, the sequence begins with a calling entity requesting services from the platform firmware (step 302). The initial request may also trigger a request to establish a session between the platform firmware and the calling entity. While responding to the SMI triggered by the request, the firmware provides the public half of an asymmetric key pair to the caller (step 304). For example, the public half of the asymmetric key pair may be provided by the firmware to the caller via an unencrypted communication buffer. The firmware has access to both halves of the asymmetric key pair. Ideally, the halves of the asymmetric key pair should be not be generated at build time, but rather should be generated either as a part of a platform initialization step by the BIOS itself, by a provisioning utility, by the BIOS POST, or by the first call to this facility, since generating key pairs can take several seconds. The returned public half of the key may also be signed as a further security measure. Upon receiving the public half of the asymmetric key pair, the caller generates a random symmetric key (in a format specified by the firmware when returning the public key or otherwise known to both the caller and the firmware), signs the randomly generated symmetric key using the public half of the asymmetric key pair and conveys a copy of the signed randomly generated symmetric key to the platform firmware (step 306). The firmware decrypts the copy of the randomly generated symmetric key using the private half of the asymmetric key pair and saves it for future use (step 308). Firmware services are then requested and performed by the calling entity and the platform firmware respectively using the randomly generated symmetric key to encrypt and decrypt the function parameters and results related to the requested firmware services (step 310). For example, the caller may use the randomly generated symmetric key to encrypt function parameters and other data placed in the communication buffer and to decrypt result data retrieved from the communication buffer after the requested firmware services return. Similarly, the firmware uses its copy of the randomly generated symmetric key to decrypt parameters and other data retrieved from the communication buffer after they are placed there by the caller and to encrypt the result data from the performance of the firmware service prior to placing it in the communication buffer for return to the caller.

In one embodiment, prior to using the symmetric key, the OS application or other calling entity verifies that the firmware has correctly installed the symmetric key. This verification may prevent the case where an attacker uses the returned asymmetric key (i.e.: the public half) to sign another key. Rather than waiting for a future command to fail, a firmware function may be invoked to send a random number. The SMM software interface command handler may encrypt the random number using the randomly generated symmetric key and copy the results to the command buffer. The caller may then verify that the results are the same as it found when encrypting the same random number using the randomly generated symmetric key.

Figure 4:
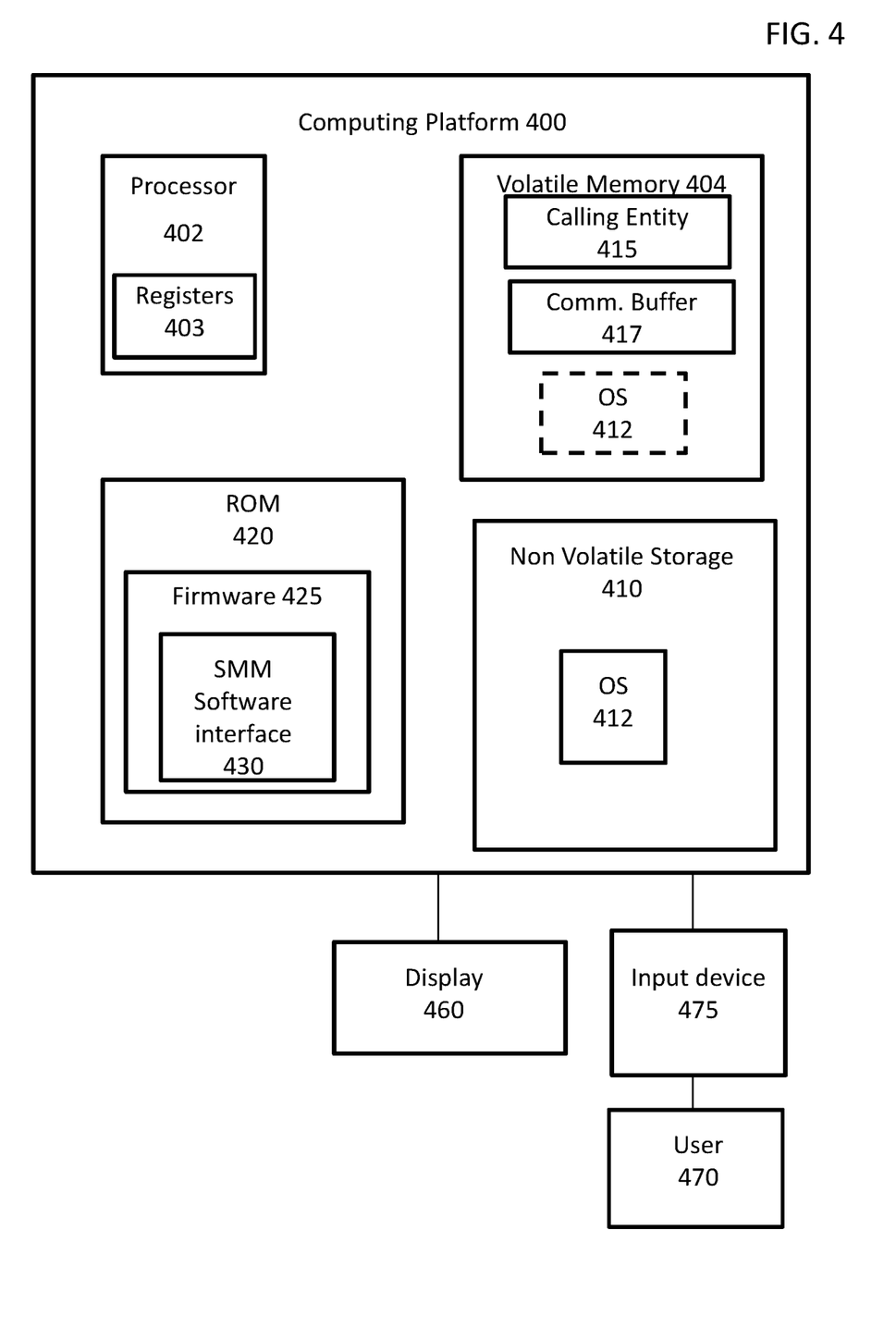
FIG. 4 depicts an exemplary computing platform suitable for performing embodiments of the present invention.

FIG. 4 depicts an exemplary computing platform 400 suitable for performing embodiments of the present invention. Computing platform 400 may be, but is not limited to, a server, desktop computer, laptop computer, mobile computing device, smartphone, medical device, embedded system, etc. Computing platform 400 includes a processor 402 such as, but not limited to a central processing unit (CPU), and volatile memory 404 such as RAM. Processor 402 includes registers 403. Computing platform 400 may also include non-volatile storage 410 such as a hard drive holding an operating system (OS) 412 that is loaded into volatile memory 404 during a boot sequence. Computing platform 400 may also include Read Only Memory (ROM) 420 holding platform firmware 425 including UEFI BIOS firmware. Platform firmware 425 may provide an SMM software interface 430 providing functions enabling a calling entity 415 to communicate with platform firmware as described herein. ROM 420 may be flash memory and may be provided in the form of one or more NVDIMMs (not shown) that may each include Flash memory, DRAM and a memory controller. Firmware 425 may be executed during a boot sequence for the computing platform 400 as well as at other times (i.e.; during runtime). Calling entity 415 operating in volatile memory during runtime may use functions provided by SMM software interface 430 to request firmware services. Parameters for requested firmware services may be stored in communication buffer 427 or registers 403 prior to an SMI being triggered. Results from performed firmware services may be returned to calling entity 415 via communication buffer 427 by platform firmware 425. A user 470 may utilize an input device 475 such as a keyboard or touch screen to interact with computing platform 400. Display 460 may be integrated into computing platform 400 or may be a separate display surface.

In an embodiment, password entry may be protected by using an external device, or a protected CPU environment. Without such protection, there is a possibility that the application's memory could be snooped by an OS driver, or a hardware-enabled DMA agent. For example, some CPUs provide technologies, such as Intel®'s Software Guard Extensions (SGX) that help create secure enclaves (private regions of memory encrypted by the CPU), in which data cannot be snooped by another process. In these secure enclaves, keys, such as the randomly generated symmetric key, asymmetric key pair, and symmetric keys generated from user-supplied passwords that were discussed above, can be used or generated by the caller and/or platform firmware. Likewise, memory encryption or IOMMU can prevent snooping by DMA-enabled hardware.

In some embodiments, some security levels other than a password-based level may require other forms of credentials. Further, the techniques described herein may be extended to include a user name aligned with UEFI's User Identity.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A non-transitory medium holding executable instructions for securing firmware function calls using session-based security, the instructions when executed on at least one computing platform equipped with platform firmware and at least one processor causing the computing platform to: receive with the platform firmware a request to establish a session between a calling entity and the platform firmware; receive with the platform firmware an encrypted password for the session from the calling entity, the password supplied by a user to the calling entity and encrypted with a symmetric encryption key generated from the password, a copy of the password previously stored with the firmware; decrypt the received encrypted password with the platform firmware using a copy of the symmetric encryption key generated from the copy of the password previously stored with the firmware to verify the password; and perform one or more requested firmware services during the session following verification of the password, the calling entity and the platform firmware exchanging firmware function call parameters and data related to the one or more requested firmware services, the calling entity and the platform firmware respectively encrypting and decrypting the firmware function call parameters and the data using the symmetric encryption key.

2. The medium of claim 1 wherein the instructions when executed further cause the computing platform to:
return a session token to the calling entity in response to the request to establish the session, wherein the encrypted password received by the platform firmware is salted with the session token and the platform firmware verifies the session token in addition to verifying the password.

3. The medium of claim 2 wherein the session token is updated and encrypted with each return of data by the platform firmware to the calling entity and the updated session token is included in a next request to the platform firmware.

4. The medium of claim 1 wherein the firmware function call parameters and the data are exchanged via one or more communication buffers.

5. The medium of claim 1 wherein the symmetric encryption key is generated, used or both, within a secure enclave created by a Central Processing Unit (CPU) in the computing platform.

6. A computing platform-implemented method for securing firmware function calls using session-based security, the computing platform equipped with platform firmware and at least one processor, the method comprising: receiving with the platform firmware a request to establish a session between a calling entity and the platform firmware; receiving with the platform firmware an encrypted password for the session from the calling entity, the password supplied by a user to the calling entity and encrypted with a symmetric encryption key generated from the password, a copy of the password previously stored with the firmware; decrypting the received encrypted password with the platform firmware using a copy of the symmetric encryption key generated from the copy of the password previously stored with the firmware to verify the password; and performing one or more requested firmware services during the session following verification of the password, the calling entity and the platform firmware exchanging firmware function call parameters and data related to the one or more requested firmware services, the calling entity and the platform firmware respectively encrypting and decrypting the firmware function call parameters and the data using the symmetric encryption key or the copy of the symmetric key.

7. The method of claim 6, further comprising:
returning a session token to the calling entity in response to the request to establish the session,
wherein the encrypted password received by the platform firmware is salted with the session token and the platform firmware verifies the session token in addition to verifying the password.

8. The method of claim 7 wherein the session token is updated and encrypted with every return of data by the platform firmware to the calling entity and the updated session token is included in a next request to the platform firmware.

9. The method of claim 6 wherein the firmware function call parameters and the data related to the one or more requested firmware services are exchanged via one or more communication buffers.

10. The method of claim 6 wherein the symmetric key is generated, used or both, within a secure enclave created by a Central Processing Unit (CPU) in the computing platform.

11. A computing platform configured to provide session-based security, comprising: one or more processors; a non-volatile storage holding platform firmware, the platform firmware when executed: receiving a request to establish a session between a calling entity and the platform firmware; receiving an encrypted password for the session from the calling entity, the password supplied by a user to the calling entity and encrypted with a symmetric encryption key generated from the password, a copy of the password previously stored with the platform firmware; decrypting the received encrypted password using a copy the symmetric encryption key generated from the copy of the password previously stored with the firmware to verify the password; and performing one or more requested firmware services during the session following verification of the password, the calling entity and the platform firmware exchanging firmware function call parameters and data related to the one or more requested firmware services, the calling entity and the platform firmware respectively encrypting and decrypting the firmware function call parameters and the data using the symmetric encryption key.

12. The computing platform of claim 11, further comprising:
a Central Processing Unit (CPU) configured to create a private region of memory within which the symmetric key is generated, used or both generated and used.

\* \* \* \* \*